(12) United States Patent
Stacey et al.

(10) Patent No.: US 9,323,758 B1
(45) Date of Patent: Apr. 26, 2016

(54) EFFICIENT MIGRATION OF REPLICATED FILES FROM A FILE SERVER HAVING A FILE DE-DUPLICATION FACILITY

(75) Inventors: Christopher H. Stacey, Chistchurch (NZ); Paul LeMahieu, Pasadena, CA (US)

(73) Assignee: EMC Corporation, Hopkinton, MA (US)

( * ) Notice: Subject to any disclaimer, the term of this patent is extended or adjusted under 35 U.S.C. 154(b) by 1546 days.

(21) Appl. No.: 12/644,849

(22) Filed: Dec. 22, 2009

(51) Int. Cl.
*G06F 17/30* (2006.01)
*G06F 11/14* (2006.01)

(52) U.S. Cl.
CPC ...... *G06F 17/30073* (2013.01); *G06F 11/1446* (2013.01); *G06F 17/30088* (2013.01); *G06F 17/30097* (2013.01)

(58) Field of Classification Search
CPC .................... G06F 17/30073; G06F 17/30088; G06F 17/30097; G06F 17/3012; G06F 11/1446
USPC .................. 707/602, 610, 624, 625, 626, 637
See application file for complete search history.

(56) References Cited

U.S. PATENT DOCUMENTS

| | | | |
|---|---|---|---|
| 5,832,487 A * | 11/1998 | Olds et al. | |
| 5,893,140 A | 4/1999 | Vahalia et al. | |
| 6,324,581 B1 | 11/2001 | Xu et al. | |
| 6,353,878 B1 | 3/2002 | Dunham | |
| 6,477,544 B1 | 11/2002 | Bolosky et al. | |
| 6,633,870 B1 * | 10/2003 | Bradley | |
| 6,636,593 B1 * | 10/2003 | MeLampy et al. | 379/114.15 |
| 6,643,670 B2 * | 11/2003 | Parham et al. | 707/610 |
| 6,658,522 B1 | 12/2003 | Martin et al. | |
| 6,938,039 B1 | 8/2005 | Bober et al. | |
| 7,117,246 B2 * | 10/2006 | Christenson et al. | 709/206 |
| 7,146,368 B2 * | 12/2006 | Sonoda et al. | |
| 7,206,863 B1 | 4/2007 | Oliveira et al. | |
| 7,263,590 B1 | 8/2007 | Todd et al. | |
| 7,359,925 B2 * | 4/2008 | Sugiyama | 707/647 |
| 7,546,432 B2 | 6/2009 | Stacey et al. | |
| 7,606,842 B2 * | 10/2009 | Quakenbush | |
| 7,788,224 B2 * | 8/2010 | Fleck et al. | 707/623 |
| 7,860,876 B2 * | 12/2010 | Frieder et al. | 707/759 |
| 7,913,044 B1 * | 3/2011 | Desai | G06F 11/1451 711/156 |
| 7,941,709 B1 * | 5/2011 | Hong et al. | 714/54 |
| 8,082,227 B2 * | 12/2011 | Balakrishnan | G06F 11/1451 707/640 |

(Continued)

OTHER PUBLICATIONS

Vahalia, Uresh, Unix Internals: The New Frontiers, 1996, p. 261-289 and 338-371, Prentice-Hall, Inc., Upper Saddle River, NJ.

(Continued)

*Primary Examiner* — Miranda Huang
(74) *Attorney, Agent, or Firm* — Richard Auchterlonie; Novak Druce Connolly Bove + Quigg LLP

(57) ABSTRACT

Needless migration of duplicate file data is avoided by recording in a database a record of migration of a first instance of a replicated file from a source file server to a target file server. When migrating a subsequent instance of a replicated file to the target file server, the database is searched for a record of replication of a first instance of the replicated file to the target file server. If such a record is found, the subsequent instance is replicated by sending from the source file server to the target file server attributes of the subsequent instance of the replicated file and an identification of the previously migrated data of the replicated file without re-transmission of the previously migrated data of the replicated file.

9 Claims, 16 Drawing Sheets

(56) References Cited

U.S. PATENT DOCUMENTS

| | | | |
|---|---|---|---|
| 2001/0027457 A1* | 10/2001 | Yee | 707/203 |
| 2002/0174200 A1* | 11/2002 | Kozina | 709/220 |
| 2003/0212952 A1* | 11/2003 | Shima | 715/500.1 |
| 2004/0139128 A1 | 7/2004 | Becker et al. | |
| 2005/0015409 A1* | 1/2005 | Cheng et al. | 707/200 |
| 2005/0065986 A1 | 3/2005 | Bixby et al. | |
| 2006/0212481 A1 | 9/2006 | Stacey et al. | |
| 2006/0212746 A1 | 9/2006 | Amegadzie et al. | |
| 2007/0033594 A1* | 2/2007 | Allen et al. | 719/318 |
| 2007/0088702 A1 | 4/2007 | Fridella et al. | |
| 2007/0179934 A1 | 8/2007 | Basov et al. | |
| 2007/0179990 A1 | 8/2007 | Zimran et al. | |
| 2007/0266056 A1 | 11/2007 | Stacey et al. | |
| 2008/0005141 A1* | 1/2008 | Zheng et al. | 707/101 |
| 2008/0005468 A1 | 1/2008 | Faibish et al. | |

OTHER PUBLICATIONS

Bolowsky, William J., "Single Instance Storage in Windows® 2000," USENIX Technical Program, WinsSys, Aug. 3-4, 2000, Seattle, WA, 12 pages, USENIX, Berkeley, CA.

"VMware® ESX Server Platform for virtualizing servers, storage and networking," product datasheet, 2007, 4 pages, VMWARE, Inc., Palo Alto, CA.

Baltazar, Henry, "Microsoft's Single Instance Storage vs. Deduplication," Inside eWEEK Labs, eweek.com, Ziff Davis Internet, Woburn, MA Jan. 25, 2006, 3 pages.

"Single Instance Store and SIS Backup," msdn2.microsoft.com, printed Jan. 25, 2007, 8 pages, Microsoft Corporation, Redmond, WA.

"Enginuity: The Symmetrix Storage Operating Environment," EMC White Paper, Jul. 2005, 22 pages, EMC Corporation, Hopkinton, MA.

"EMC Symmetrix DMX Architecture," Product Description Guide, Mar. 2004, 76 pages, EMC Corporation, Hopkinton, MA.

"Applying EMC OnCourse Technology in a Content Aggregation Scenario," May 6, 2003, 14 pages, EMC Corporation, Hopkinton, MA.

"Celerra Data Migration Service (CDMS)," White Paper, Jan. 2002, 14 pages, EMC Corporation, Hopkinton, MA.

"Automated Resource Management," Technology Brief—Aug. 2002, 3 pages, The Enterprise Storage Group, Milford, MA.

Babineau, Brian, "Symantec Enterprise Vault and EMC Centera—Unlocking the Benefits of Efficient Information Archiving," Jan. 2007, 11 pages, Enterprise Strategy Group, Milford, MA.

Wendt, Jerome M., "Tech Report: Content-addressed storage preferred for fixed-content storage," Jun. 19, 2006, 5 pages, searchstorage.com, Needham, MA.

"Information Lifecycle Management: An Automated Approach," Technical White Paper, Dec. 8, 2003, 20 pages, EMC Corporation, Hopkinton, MA.

FIPS Publication 198, The Keyed-Hash Message Authentication Code (HMAC), Mar. 6, 2002, 20 pages, National Institute of Standards and Technology, Gaithersburg, MD.

Palmer, Tony, et al., Rainfinity File Virtualization Appliance, Lab Validation Report, t, Sep. 2008, 24 pages, Enterprise Strategy Group, Milford, MA.

DuBois, Laura, Data Deduplication for Backup: Accelerating Efficiency and Driving Down IT Costs, May 2009, 16 pages, IDC, Framingham, MA.

Achieving Storage Efficiency with EMC Celerra, White Paper, May 2009, 20 pages, EMC Corporation, Hopkinton, MA.

\* cited by examiner

EFFICIENT MIGRATION OF REPLICATED FILES FROM A FILE SERVER HAVING A FILE DE-DUPLICATION FACILITY

FIELD OF THE INVENTION

The present invention relates to migration of replicated files in a data network.

BACKGROUND OF THE INVENTION

In recent years there has been a problem of an increasing number of stored electronic documents that have identical or virtually identical content. For example, the Microsoft Outlook™ electronic mail system ordinarily results in multiple copies of an attachment being kept in data storage of a business enterprise when a document is sent by electronic mail to multiple recipients in the business enterprise.

In an attempt to solve the problem of multiple copies of a file being kept in a storage volume, Microsoft Corporation introduced a Single Instance Storage (SIS) feature in its Microsoft Windows® 2000 server. See William J. Bolosky, "Single Instance Storage in Windows® 2000," USENIX Technical Program, WinsSys, Aug. 3-4, 2000, Seattle, Wash., USENIX, Berkeley, Calif. SIS uses links to the duplicate file content and copy-on-close semantics upon these links. SIS is structured as a file system filter driver that implements the links and a user level service that detects duplicate files and reports them to the filter for conversion into links.

In a file server having a file de-duplication facility, each file in a de-dupe file system has a de-dupe attribute indicating whether nor not the file has undergone a de-duplication task. When a file is migrated into the file server, the de-dupe attribute is initially cleared. The de-duplication task computes a hash of the data in the file to be de-duplicated. This hash is compared to hash values of de-duplicated files in the de-dupe file system. If the hash of the file to be de-duplicated matches the hash of a de-duplicated file in the de-dupe file system, then this match indicates a high probability that the data will also match. The file data may also be compared to further validate a match of the hash values. If a match of the file data is found, then the file to be de-duplicated is replaced with a stub inode linked to the indirect blocks and data blocks of the matching de-duplicated file.

Migration of files between file servers typically occurs in a hierarchical storage system, or in a distributed network storage system employing namespace virtualization, or in a wide-area network for distribution of read-only copies to remote mirror sites.

In a hierarchical storage system, frequently accessed files are kept in a primary file server having relatively fast but expensive storage, and less frequently accessed files are kept in a secondary file server having relatively inexpensive and slow storage. If a file stored in the primary file server is not accessed over a certain duration of time, the file is automatically migrated from the primary file server to the secondary file server. Client workstations request access to the file from the primary file server, and if the file is not found in the primary file server, then the primary file server requests access to the file from the secondary file server, and the file is migrated from the secondary file server back to the primary file server.

In a distributed network storage system employing namespace virtualization, the client workstations send file access requests to a namespace server. The namespace server maps the user-visible file names to pathnames in a storage network namespace, and functions as a proxy server by forwarding the translated client file access requests to back-end servers in the storage network. The namespace server may migrate files between back-end servers for load balancing upon the back-end servers and for more efficient utilization of different classes of storage by moving infrequently accessed files to slower and less expensive storage and by moving frequently accessed files to faster and more expensive storage.

In a wide-area network, read-only files, such as web pages and document or program downloads, are often distributed from a local site to one or more geographically remote sites for servicing users in different geographic regions or countries. The remote sites are maintained as least-recently-accessed caches of the read-only files. A file copy is migrated from the local site to a remote site in response to a request for access of a remote user when the requested file is not found at the remote site in the user's region or country.

SUMMARY OF THE INVENTION

It has been discovered that file-by-file migration between source and target file servers has not been aware of file de-duplication occurring on the source and target file servers. The file-by-file migration has been transferring file data from the source server to the target server in cases where duplicate file data has already been transferred to the target server. The migration of replicated files can be made more efficient in both time and network bandwidth by recognizing that the target file server already contains the data of a replicated file in order to eliminate needless transfer of duplicate file data. This can be done in a way that is compatible with conventional file access protocols, file system management, and file de-duplication.

In accordance with one aspect, the invention provides a computer-implemented method of at least one data processor executing a file migration program in memory in response to a request for migration of a specified file from a source file server to a target file server in a data network. The method includes the steps of: searching storage in the data network for a record indicating that the target file server contains a replica of the specified file, the replica of the specified file having data of the specified file, and the replica of the specified file having attributes different from attributes of the specified file; and in response to finding a record indicating that the target file server contains a replica of the specified file, creating a copy of the specified file in the target file server by copying the attributes but not the data of the specified file from the source file server to the target file server and associating the copied attributes of the specified file in the target file server with the data of the replica of the specified file in the target file server.

In accordance with another aspect, the invention provides a computer-implemented method of at least one data processor executing a file migration program in memory to migrate instances of a replicated file from a source file server to a target file server. Each of the instances of the replicated file has the same file data but different file attributes. The method includes, upon migration of attributes and data of a first instance of the replicated file from the source file server to the target file server, recording in a database a record of migration of the first instance of the replicated file from the source file server to the target file server. The method further includes, upon migration of a second instance of the replicated file, searching the database for a record of a prior migration of an instance of the replicated file, and in response to finding the record of the migration of the first instance of the replicated file in the database, migrating the second instance of the replicated file from the source file server to the target file server by sending from the source file server to the target file server attributes of the second instance of the replicated file and an identification of the previously migrated data of the replicated file so that the second instance of the replicated file is migrated from the source file server to the target file server without re-transmission of the previously migrated data of the replicated file.

In accordance with a final aspect, the invention provides a data processing system including a source file server and a target file server in a data network, and memory containing a file migration program. The file migration program is executable by at least one data processor in the data processing system to migrate instances of a replicated file from the source file server to the target file server. Each of the instances of the replicated file has the same file data but different file attributes. Upon migration of attributes and data of a first instance of the replicated file from the source file server to the target file server, execution of the file migration program includes recording in a database a record of migration of the first instance of the replicated file from the source file server to the target file server. Upon migration of a second instance of the replicated file, execution of the migration program includes searching the database for a record of migration of an instance of the replicated file, and in response to finding the record of migration of the first instance of the replicated file in the database, migrating the second instance of the replicated file from the source file server to the target file server by sending from the source file server to the target file server attributes of the second instance of the replicated file and an identification of the previously migrated data of the replicated file so that the second instance of the replicated file is migrated from the source file server to the target file server without re-transmission of the previously migrated data of the replicated file.

BRIEF DESCRIPTION OF THE DRAWINGS

Additional features and advantages of the invention will be described below with reference to the drawings, in which.

Figure 1:
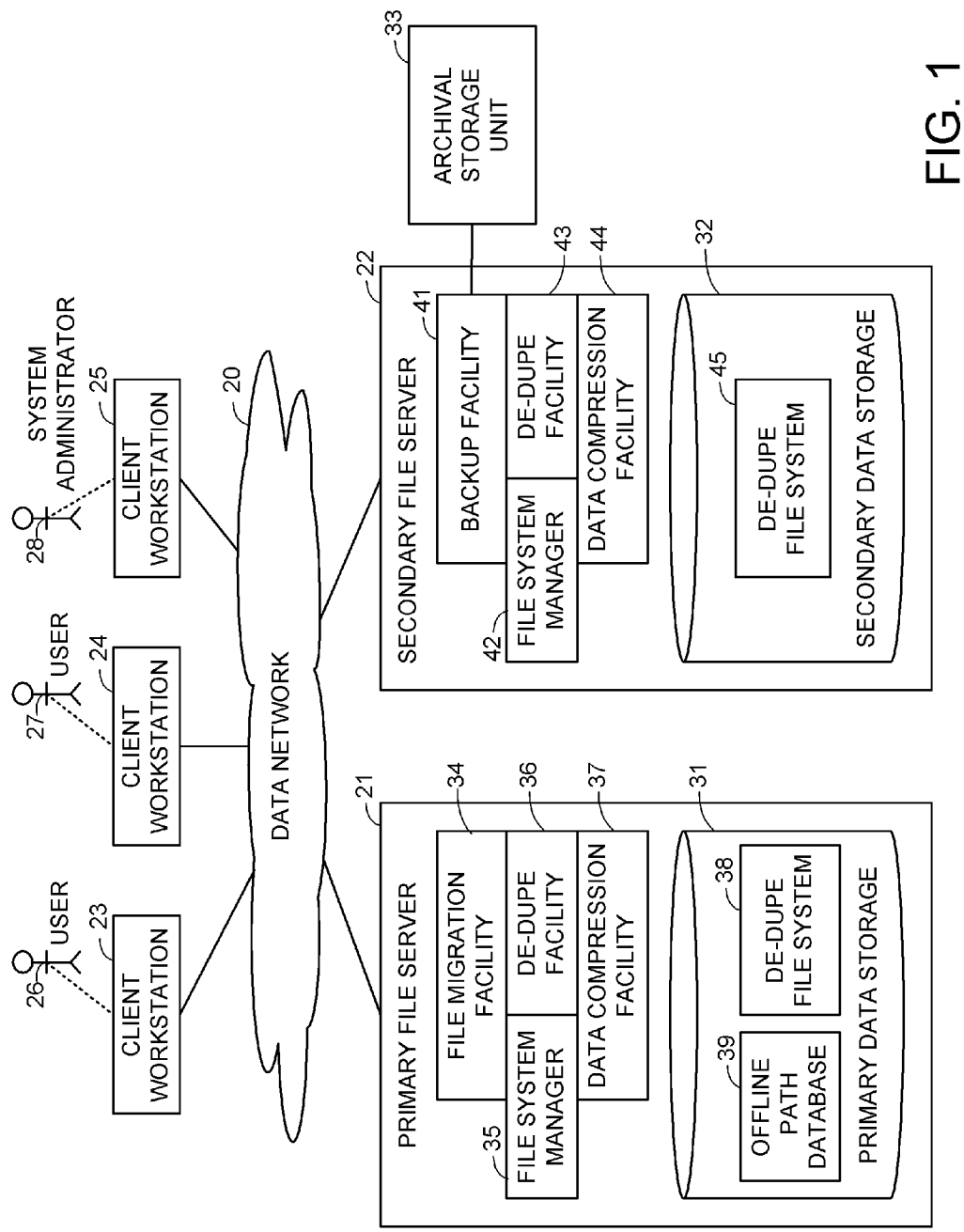
FIG. 1 is block diagram of a data processing system employing migration of replicated files in accordance with the present invention for hierarchical storage.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENTS

With reference to FIG. 1, there is shown a data processing system including a data network 20 linking a primary file server 21 to a secondary file server 22 in a hierarchical storage arrangement for serving client workstations 23, 24, 25 operated by human users 26, 27, 28. The data network 20, for example, is an Ethernet or Internet Protocol (IP) data network. The user 28 is a system administrator responsible for configuration and maintenance of the data processing system.

The primary file server 21 includes primary data storage 31, and the secondary file server 22 includes secondary data storage 32. The primary data storage 31 is relatively fast and expensive storage, such as solid-state disk drives. The secondary data storage 32 is relatively slow but inexpensive and massive storage, such as rotating magnetic disk drives. The secondary file server 22 is linked to an archival storage unit 33 including very slow but inexpensive and very massive storage, such as optical disk or magnetic tape.

In operation, the client workstations create and access files in the primary data storage 31. If these files are not accessed over a certain duration of time, the files are migrated from the primary data storage 31 to the secondary data storage 32, and deleted from the primary data storage 31. Least recently accessed files in the primary data storage 31 are also migrated from the primary data storage 31 to the secondary data storage 32 as needed to maintain a certain amount of free storage in the primary data storage 31. In a similar fashion, if files in the secondary data storage 32 are not accessed over a certain duration of time, the files are migrated from the secondary data storage to the archival storage unit 33, and deleted from the secondary data storage. Files are recalled from the archival storage unit 33 and from the secondary data storage 32 and migrated back to the primary storage 31 when the files are accessed by the client workstations 23, 24, 25.

The file servers 21 and 22 also have facilities for redundant data elimination for more efficient use of the available storage capacity. The redundant data elimination techniques include de-duplication of the file data of replicated files, and compression of the file data. As will be further described below, the migration of the files is coordinated with the de-duplication in order to eliminate needless transfer of duplicate file data under appropriate circumstances.

For example, as shown in FIG. 1, the primary file server 21 is programmed with a file migration facility 34 for migrating files between the primary data storage 31 and the secondary data storage 32. The primary file server 21 is also programmed with a file system manager 35, a de-duplication facility 36, and a data compression facility 37. The secondary file server 22 is programmed with a backup facility 41 for migrating files between the secondary data storage 32 and the archival storage unit 33. The secondary file server 22 is also programmed with a file system manager 42, a de-duplication facility 43, and a data compression facility 44. The file system manager 35 and the de-duplication facility 36 in the primary file server 21 are operative upon a de-dupe file system 38 in the primary data storage 31. In a similar fashion, the file system manager 42 and the de-duplication facility 43 in the secondary file server 22 are operative upon a de-dupe file system 45 in the secondary data storage 32. In order to eliminate needless transfer of duplicate file data under appropriate circumstances, the file migration facility 34 maintains an offline path database 39 containing records of replicated files that have been migrated from the primary file server 21 to the secondary file server 22.

Figure 2:
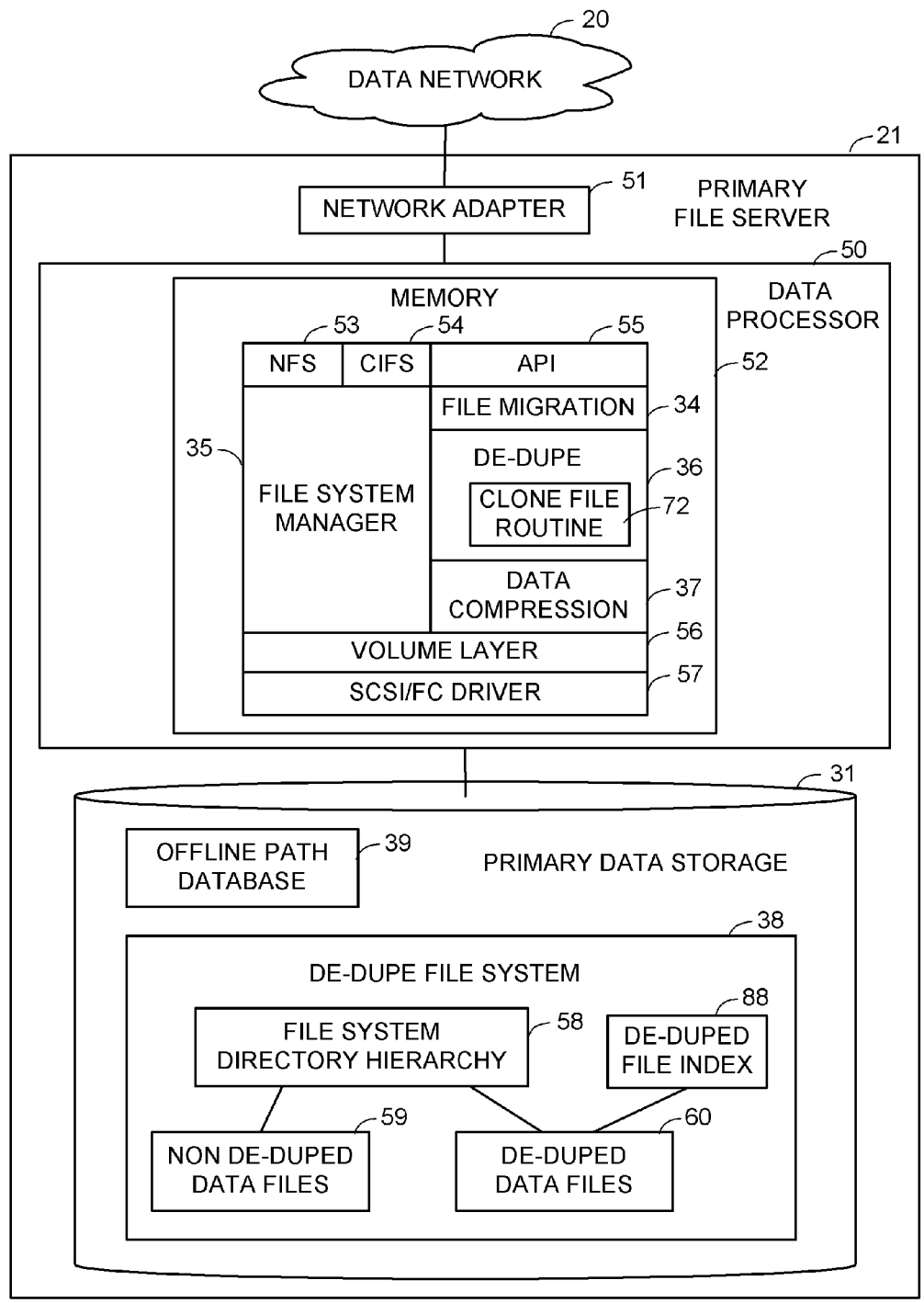
FIG. 2 is a block diagram of a primary file server introduced in FIG. 1.

FIG. 2 shows further details of the primary file server 21. The primary file server includes a network adapter 51 linking the file server to the data network 20, and a data processor 50 coupled to the network adapter 51 and programmed for responding to client requests for access to files in the primary data storage 31.

The data processor 50 has a memory 52 containing program instructions organized into a number of program layers. The programs include a Network File System (NFS) module 53, a Common Internet File System (CIFS) module 54, and an application program interface (API) module 55. The NFS module 53 recognizes file access commands received by the network adapter 51 from the client workstations (23, 24, and 25 in FIG. 1) in accordance with the NFS protocol. The CIFS module 54 recognizes file access commands received by the network adapter 51 from the client workstations (22, 23, and 24 in FIG. 1) in accordance with the CIFS protocol. For example, network clients such as UNIX (Trademark) workstations may use the Network File System (NFS) protocol to access files in the primary data storage 31, and network clients such as Microsoft Windows (Trademark) workstations may use the Common Internet File System (CIFS) protocol to access files in the primary data storage 31.

The application program interface (API) module 55 recognizes additional file access commands which may extend the functionality of the NFS and CIFS protocols. For example, if the NFS module 53 or the CIFS module 54 receives a file access request including an operation code that is not in accordance with the NFS or CIFS protocol, then the NFS module 53 or the CIFS module 54 will invoke the API module 55 in an attempt to execute the operation or function. The API module 55 may also respond to remote procedure calls from network clients in accordance with other network protocols, such as the Simple Network Management Protocol (SNMP) or the Hypertext Transfer Protocol (HTTP).

The file system manager 35 manages hierarchical file systems in the primary data storage 31. A suitable kind of file system is the UNIX file system, as described in Chapter 9, pp. 261-289 of Uresh Vahalia, Unix Internals: The New Frontiers, 1996, Prentice Hall, Inc., Simon & Schuster, Upper Valley River, N.J. 07458. The file system manager 35 is further described in Vahalia et al. U.S. Pat. No. 5,893,140 issued Apr. 6, 1999, entitled "File Server Having a File System Cache and Protocol for Truly Safe Asynchronous Writes," incorporated herein by reference.

The data processor 50 is also programmed with the file migration facility 34, the de-duplication facility 36, and the data compression facility 37. The de-duplication facility 36 includes a clone file routine 72 for replicating a specified file by creating a new file sharing the file data of the specified file. The data processor 50 is further programmed with a volume layer 56 for organizing the primary data storage 31 into logical volumes of data blocks, and a Small Computer System Interface (SCSI) or Fibre Channel (FC) driver 57 for linking the volume layer 56 to the primary data storage 31.

As further shown in FIG. 2, the de-dupe file system 38 includes a file system directory hierarchy 58, non de-duped data files 59, de-duped data files 60, and a de-duped file index 88. The non de-duped files 59 do not share indirect blocks or data blocks of the primary data storage. Each of the de-duped files 60 will share the indirect blocks and data blocks of any other de-duped files that contain all of the same file data. The de-duped file index 88 provides a way of quickly determining whether or not a given one of the non de-duped files 59 contains all of the same file data as at least one of the de-duped data files 60. For example, the de-duped file index 88 includes a list of hash values associated with each disjoint set of data blocks of any of the de-duped data files. For each hash value, the de-duped file index 88 includes a respective pointer to each disjoint set of data blocks associated with the hash value, and a reference count associated with that disjoint set of data blocks. The reference count indicates the number of de-duped data files 60 that share the disjoint set of data blocks.

Figure 3:
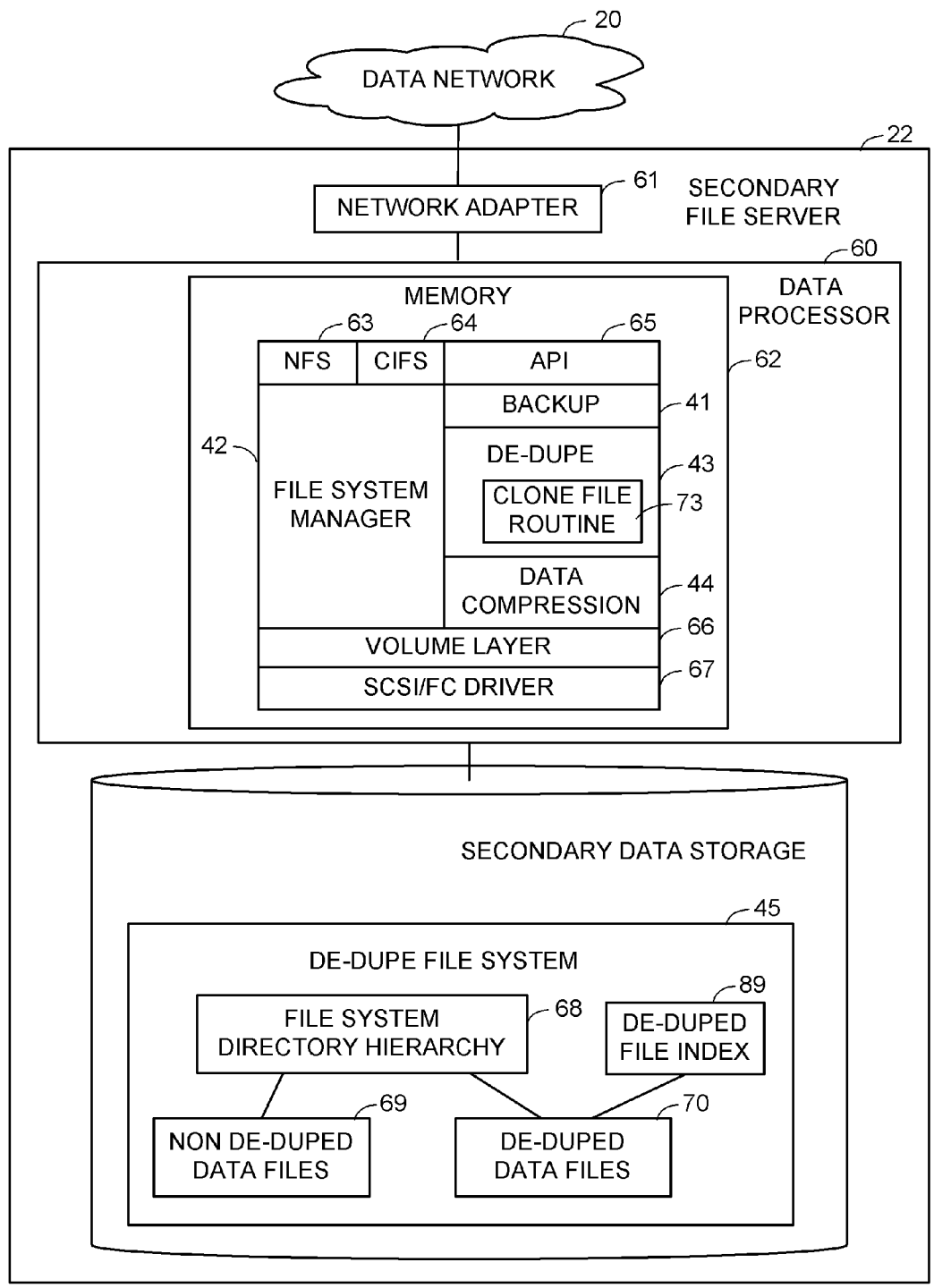
FIG. 3 is a block diagram of a secondary file server introduced in FIG. 1.

FIG. 3 shows further details of the secondary file server 22. The secondary file server 22 is similar to the primary file server (21 in FIG. 2), except that the file migration facility (34 in FIG. 2) and its offline path database (30 in FIG. 2) have been replaced with the backup facility 41. Thus, the secondary file server 22 further includes a data processor 60, a network adapter 61, memory 62, a NFS module 63, a CIFS module 64, an API module 65, a clone file routine 73, a volume layer 66, and a SCSI or FC driver 67. The de-dupe file system 45 in the secondary data storage 32 includes a file system directory hierarchy 68, non de-duped data files 69, de-duped data files 70, and a de-duped file index 80.

Figure 4:
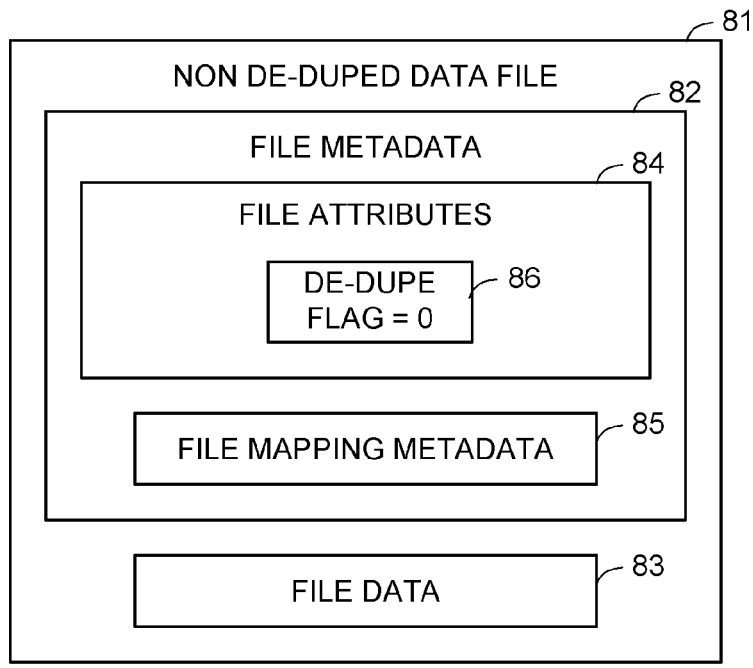
FIG. 4 is a block diagram of a non de-duped data file in storage of the primary file server of FIG. 2 or in storage of the secondary file server of FIG. 3.

FIG. 4 shows a non de-duped data file 81. The non de-duped data file has a conventional organization, including file metadata 82 and file data 83. The file metadata 82 includes file attributes 84 and file mapping metadata 85. The file attributes 84 include a de-dupe flag 86 set to zero to indicate that the file has not yet been de-duplicated.

Figure 5:
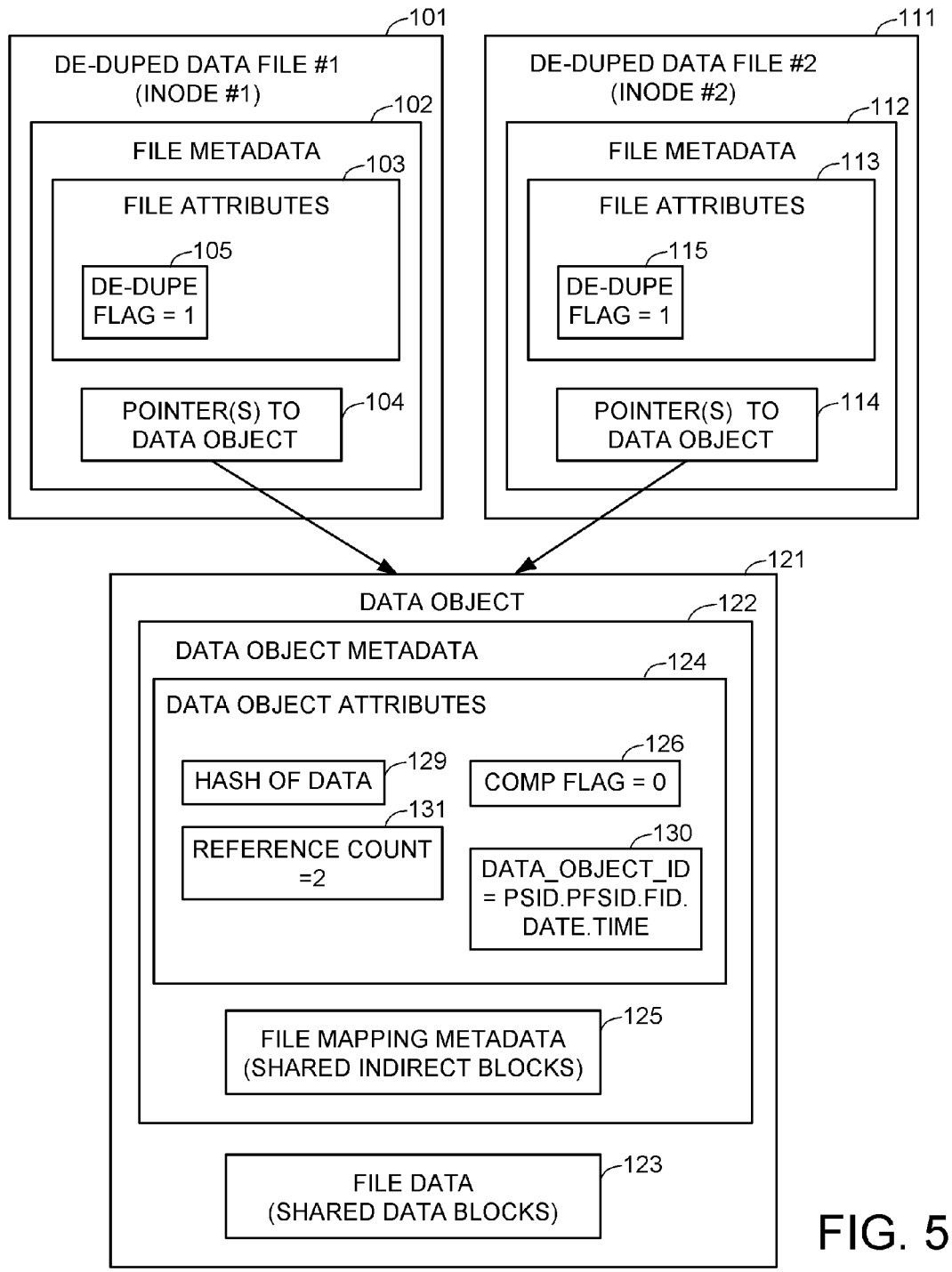
FIG. 5 is a block diagram of two instances of a replicated file, in which each instance has a respective stub inode and the two instances share the same file data.

FIG. 5 shows two de-duped file inodes 101 and 102 sharing a data object 121. In other words, FIG. 5 shows two instances of a replicated file, in which each instance has different file attributes but the two instances have the same file data. The file inodes 101 and 111 have a conventional organization for UNIX file inodes. The first file inode 101 includes file metadata 102 including file attributes 103 and at least one pointer 104 to the data object 121. The file attributes 103 include a de-dupe flag 105 set to 1 indicating that the file of the inode 101 has been de-duplicated. In a similar fashion, the second file inode 111 includes file metadata 112 including file attributes 113 and at least one pointer 114 to the data object 121. The file attributes 113 include a de-dupe flag 115 set to 1 indicating that the file of the inode 111 has been de-duplicated.

The data object 121 includes data object metadata 122 and file data 123. The metadata 122 includes data object attributes 124 and file mapping metadata 125. The data object attributes 124 include a flag 126 indicating whether or not the file data is in compressed form, a hash 129 of the data, a data object identifier 130 for the data object, and a reference count 131.

The data object identifier 130 should be unique at least for unique data objects in the primary file server. Such a unique object identifier can be produced from the attributes of the file from which the data object was first produced in the primary file server. For example, the file from which the data object was produced will have a unique combination of file system identifier (FSID) and file identifier (FID) in the primary file server when the data object was first produced. The file data associated with this FSID and FID will not change over a relatively short period of time, so that a unique data object identifier in the primary file server can be produced by combining the FSID and FID with a date-time stamp indicating when the data object was first produced in the primary file server and put in the de-duped file index (89 in FIG. 3). The data object identifier can also be made globally unique in the data processing system by further including a primary file server identifier (PSID) in the data object identifier. A globally unique data object identifier would be useful for data archiving to aid in disaster recovery. In this case, if the data of a replicated file has been lost or corrupted due to a disaster, the data may be recovered from any archival file copy associated with the same globally unique data object identifier.

In a preferred implementation, the file inodes 101, 111 and the data object 121 are organized so that the file data 123 is accessible in a conventional fashion for a UNIX file. Thus, the pointers 104 and 114 are the block pointers found in conventional inodes. In this case, the data object attributes 124 reside in the de-duped file index (e.g., 88 in FIG. 2). For example, an entry in the de-duped file index for containing the data object attributes is allocated when the file is de-duplicated and found to contain a unique set of file data, the block pointers in the file inode are copied to this entry, and a pointer to this entry is put in the file attributes of each inode of each instance of the file.

Figure 6:
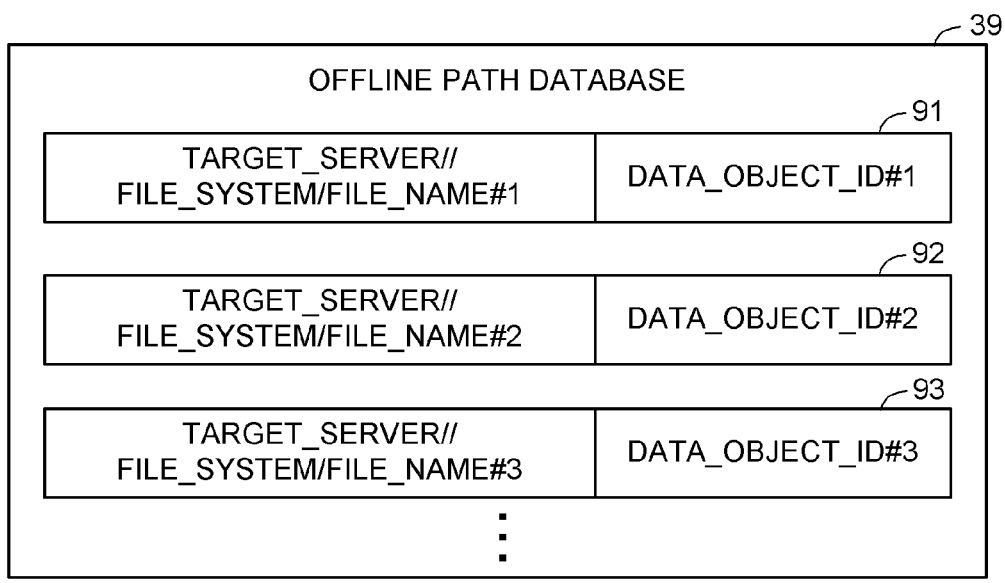
FIG. 6 is block diagram of an offline path database.

FIG. 6 shows the organization of the offline path database 39. The offline path database 39 includes records 91, 92, 93 of the replicated files and the data objects of the replicated files. For example, each record includes a file identifier of a replicated file, and an identifier of the data of the replicated file. The file identifier is a file name, file handle, or other identifier that can be used by a client for accessing the replicated file. The identifier of the data of the replicated file can be used for accessing the data of the replicated file in the source or target server. The identifier of the data of the replicated file can be a hash or signature that uniquely identifies the data of the replicated file in the source file server or in the target file server.

In a preferred implementation, each record includes the pathname of the first instance of the replicated file that was migrated to the target server, and a data object identifier. The pathname identifies the data object as stored in the target file server, and the data object identifier identifies the data object as stored in the source file server. The data object can be obtained from the target file server by including the pathname in a file read request sent to the target file server. In a preferred implementation, the data object identifier is an identifier that is unique among identifiers of file data in a data network including the source file server and the target file server.

Figure 7:
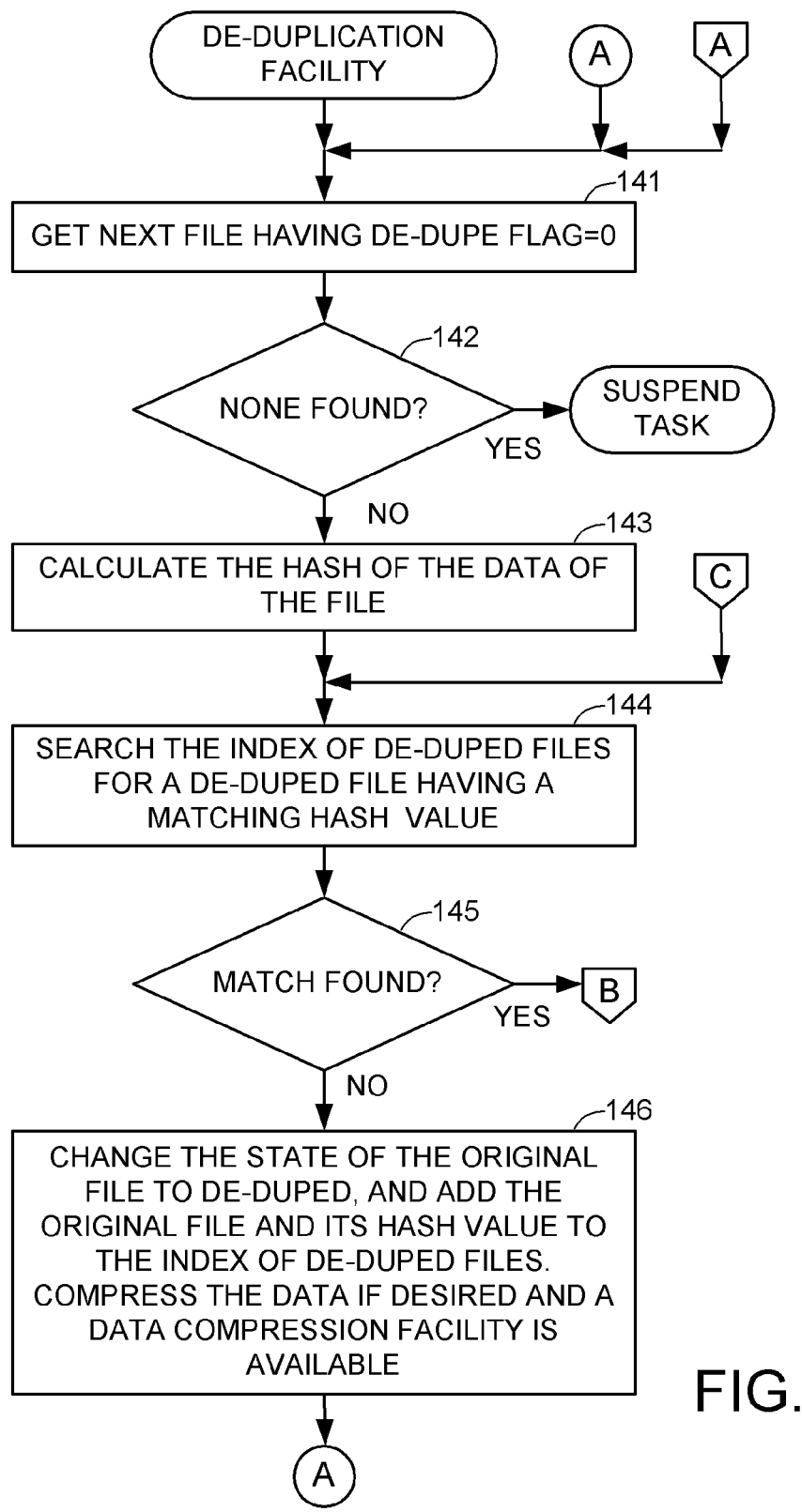
FIGS. 7 and 8 together comprise a flowchart of a file de-duplication facility.
Figure 8:
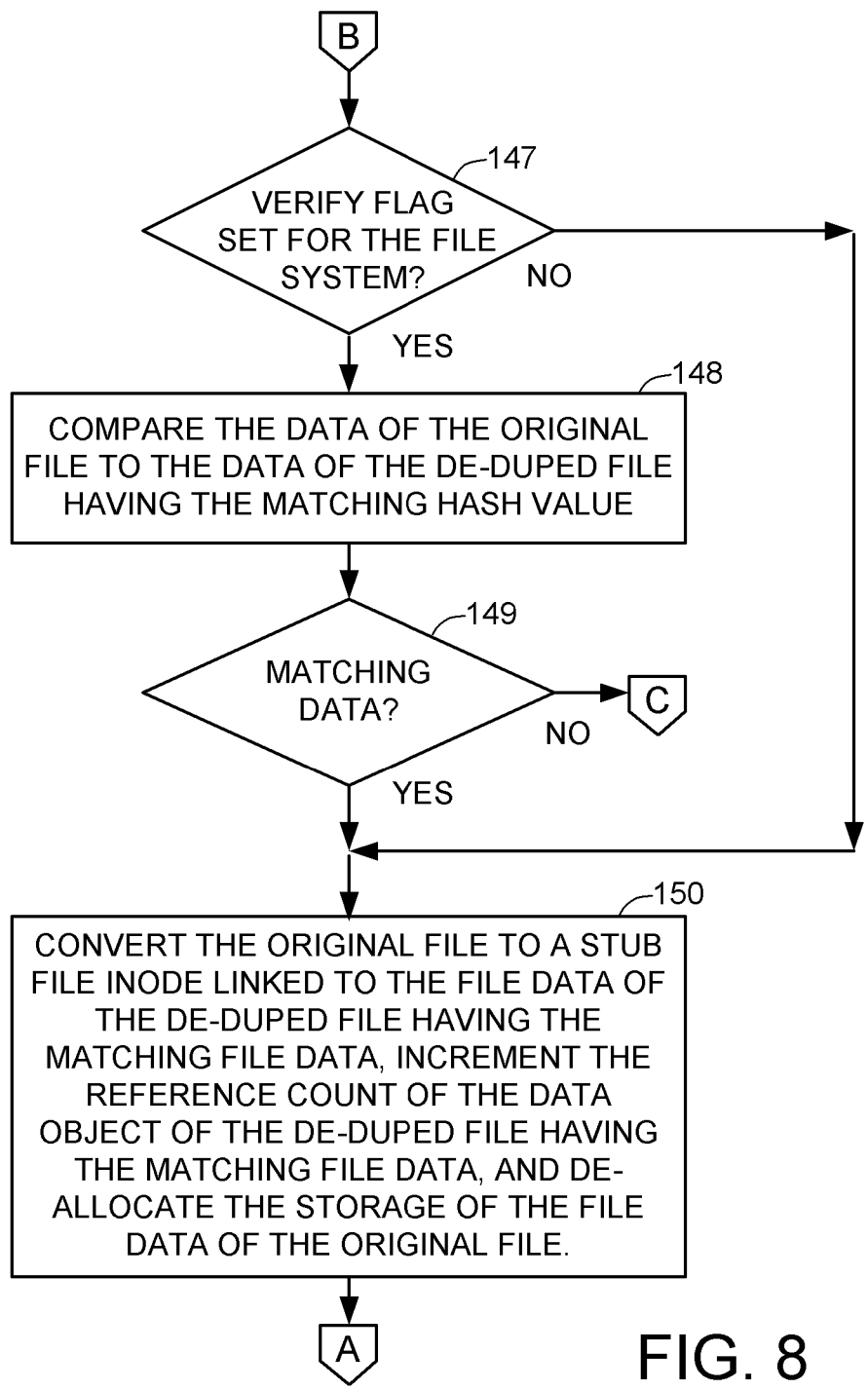

FIGS. 7 and 8 show operation of the de-duplication facility. In a first step 141 of FIG. 7, the data processor searches for a file having its de-dupe flag set to zero. In step 142, if a file having its de-duplication flag set to zero is not found, then the de-duplication task is suspended. Otherwise, execution continues from step 142 to step 143. In step 143, the data processor calculates the hash of the data of the file. For example, the hash is a checksum of the file data, or the hash is a cryptographic hash of the file data. A suitable cryptographic hash is described in FIPS Publication 198, The Keyed-Hash Message Authentication Code (HMAC), Mar. 6, 2002, National Institute of Standards and Technology, Gaithersburg, Md.

In step 144, the data processor searches the index of de-duped files for a de-duped file having a matching hash value. In step 145, if a match is not found, then in step 146 the state of the original file is changed to de-duped (for example by setting the de-dupe flag to 1), and the original file and its hash value are added to the index of de-duped files. Execution loops from step 146 back to step 141.

In step 145, if a matching hash value is found, then execution branches from step 145 to step 147 in FIG. 8. In step 147, the data processor tests whether or not a "verify flag" has been set for the file system. If so, then execution continues to step 148 to compare the data of the original file to the data of the de-duped file having the matching hash value. In step 149, if the data matches, then execution continues to step 150. In step 150, the data processor converts the original file to a stub file inode linked to the file data blocks of the de-duped file having the matching data. For example, this is done by calling the "clone file routine" (72 in FIG. 2). The data processor also increments the reference count of the data object of the de-duped file having the matching file data, and de-allocates the storage of the file data blocks of the original file. Execution loops from step 150 back to step 141 in FIG. 7.

In step 149, if matching data is not found, then execution branches back to step 144 of FIG. 7.

In step 147, if the verify flag is not set for the file system, then execution branches from step 147 to step 150. In this case, a matching hash value is presumed to provide a sufficiently high probability that the file data also matches so that the data of the de-duped file having the matching hash value can be substituted for the data of the original file. For example, the "verify flag" is set for a file system of private critical data, and the "verify flag" is not set for a file system of public read-only data. In addition, for a file system in which the "verify flag" is not set, the hash value of the data object also can be used as the object identifier of the data object.

Figure 9:
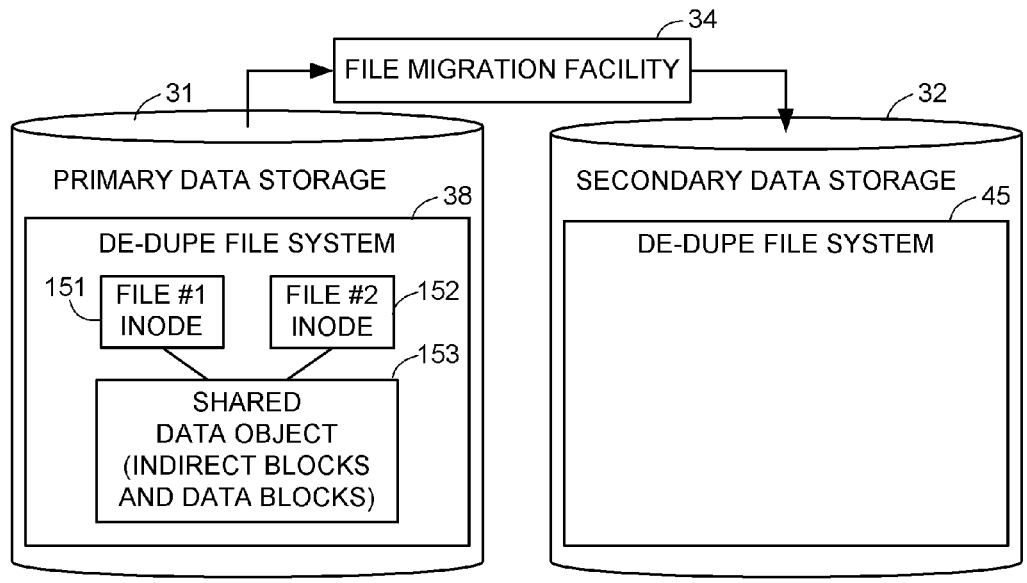
FIGS. 9, 10, 11, and 12 show successive phases of migrating two instances of a replicated file in the data processing system of FIG. 1.

FIGS. 9, 10, 11, and 12 show successive phases of migrating two instances of a replicated file in the data processing system of FIG. 1. An initial state is shown in FIG. 9. In this initial state, the de-dupe file system 38 includes two instances of a replicated file. The first instance is comprised of a first inode 151 and a shared data object 153 including shared indirect blocks and shared data blocks. The second instance is comprised of a second inode 152 and the shared data object 153.

Figure 10:
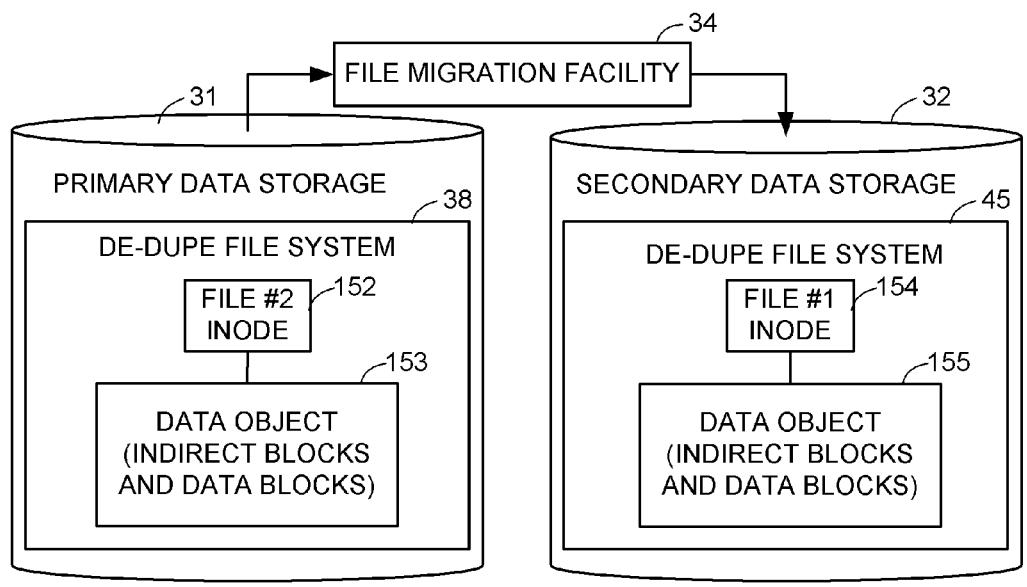

FIG. 10 shows the state of the data processing system after the file migration facility 34 has migrated the first instance of the replicated file from the primary data storage 31 to the secondary data storage 32. An inode 154 has been allocated in the secondary data storage 45. Attributes of the first instance of the replicated file have been copied from the inode 151 to the inode 154 in the secondary data storage 45, and the inode 151 has been de-allocated from the primary data storage 31. In addition, data of the first instance of the replicated file has been copied from the primary data storage 31 to the secondary data storage. Indirect blocks and data blocks of a data object 155 have been allocated in the secondary data storage 32, and the file data has been written to the data blocks.

Figure 11:
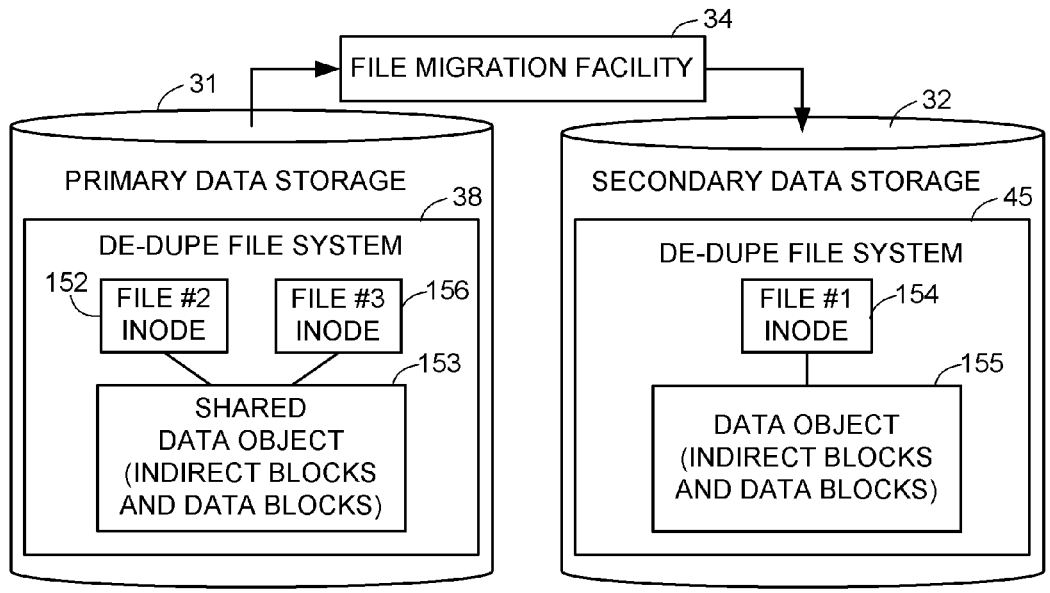

FIG. 11 shows the state of the data processing system after a third instance of the replicated file has been de-duplicated in the de-dupe file system 38 of the primary data storage 31. An inode 156 for the third instance has been linked to the data object 153 so that the third instance shares the data object 153 of the second instance.

Figure 12:
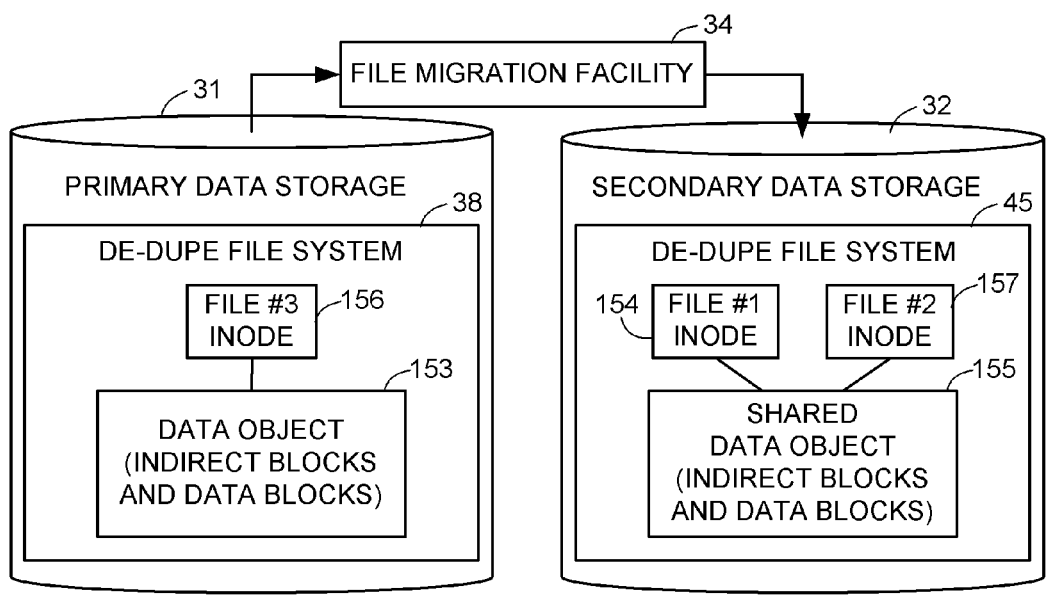

FIG. 12 shows the state of the data processing system after the second instance of the file has been migrated from the primary data storage 31 to the secondary data storage 32, and de-duplicated in the secondary data storage. An inode 157 for the second instance has been allocated in the secondary storage 32. The inode 157 has been linked to the data object 155 of the first instance 154, so that the data object 155 is now shared between the first instance and the second instance. Attributes of the second instance have been copied from the inode 152 to the inode 157 in the secondary data storage 32, and the inode 152 has been de-allocated from the primary data storage 31.

When migrating the second instance of the file from the primary data storage 31 as shown in FIG. 11 to the secondary data storage 32 as shown in FIG. 12, the file migration facility 34 did not copy the file data of the second instance of the file from the primary data storage 31 to the secondary data storage 32 in FIG. 12 because the file migration facility recognized that the secondary data storage already contained the data object 155 in the secondary data storage 32 as shown in FIG. 11. In the data processing system of FIG. 1, the file migration facility 34 searches the offline data path database 39 when migrating a replicated file in order to recognize when the file data of the replicated file has already been copied from the primary data storage 31 to the secondary data storage 32 so that the file data is not copied again for a subsequent instance of the replicated file.

Figure 13:
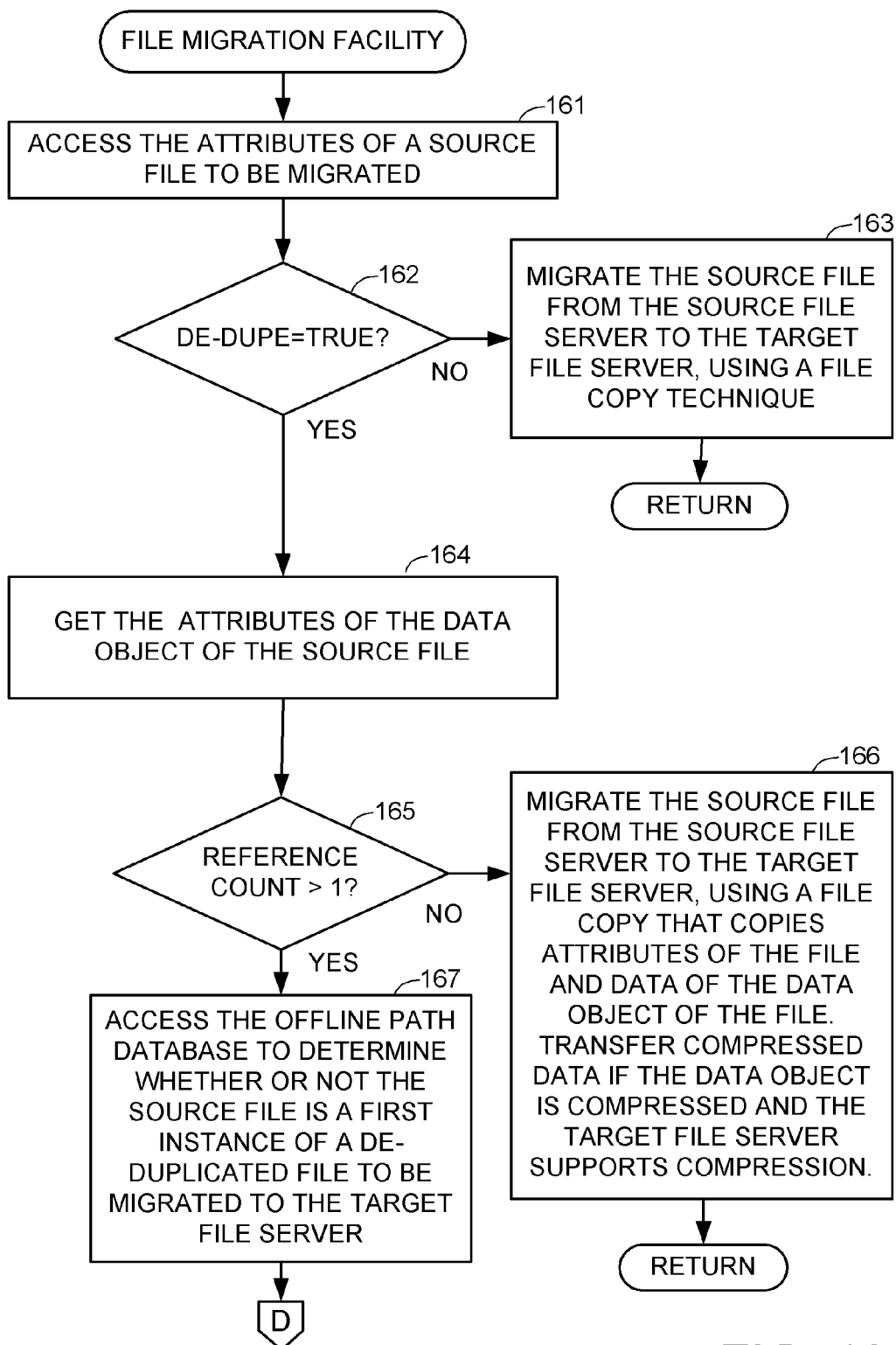
FIGS. 13 and 14 together comprise a flowchart of a file migration facility.
Figure 14:
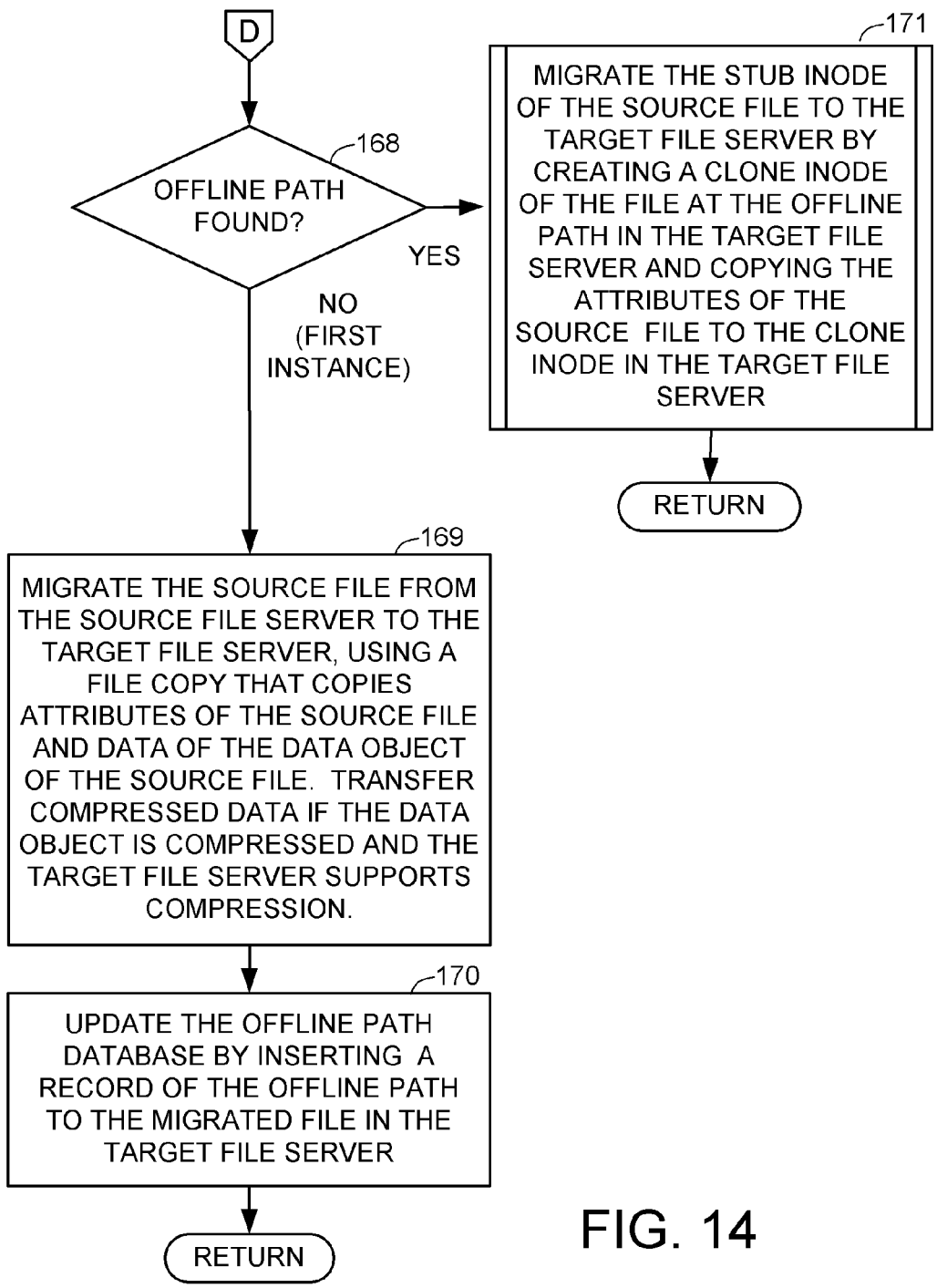

FIGS. 13 and 14 together show a flowchart of the file migration facility (34 in FIG. 1). In a first step 161 of FIG. 13, the file migration facility responds to a request for migration of a specified source file from a source file server to a target file server. The result of the migration is that the target file server will contain a copy of source file. After this migration process, the original source file may or may not be deleted from the source file server. For example, if the source file is a read-only file that is migrated to free up storage space in the source file server, the source file may be kept in the source file server for some time after the migration until free storage is actually needed in the source file server. In another arrangement, after a source file has been migrated to the target file server, the storage for the data of the source file is de-allocated (unless the source file shares the file data with another file in the source file server), yet the Mode of the source file is retained in the source file server. For example, the block pointers in the retained source file Mode are replaced with an offline network pathname to the copy of the source file in the target file server, and an offline attribute in the source file Mode is set to indicate that the file is offline.

In step 161 of FIG. 13, the data processor (50 in FIG. 2) accesses the attributes of the specified source file. In step 162, if the de-dupe attribute is not true, then execution branches to step 163. In step 163, the data processor migrates the source file from the source file server to the target file server by using a file copy technique, and execution returns.

In step 162, if the de-dupe attribute is true, execution continues from step 162 to step 164. In step 164, the data processor gets the attributes of the data object of the source file. Then in step 165, execution branches to step 166 if the reference count of the data object is not greater than one. In step 166, the data processor migrates the source file from the source file server to the target file server, by using a file copy that copies attributes of the source file and data of the data object of the source file, and then execution returns. This file copy transfers compressed data from the source file server to the target file server if the data object is compressed and the target file server supports compression. If the data object is compressed but the target file server does not support compression, then the data processor uses the data compression facility of the source file server to de-compress the file data, and the de-compressed file data is transferred from the source file server to the target file server.

In step 165, if the reference count is greater than one, then execution continues from step 165 to step 167. In step 167, the data processor accesses the offline path database to determine whether or not the source file is a first instance of a de-duplicated file to be migrated to the target file server. For example, the offline path database (39 in FIG. 6) is searched using the data object ID and the target server name as search keys.

Execution continues from step 167 to step 168 in FIG. 14. In step 168, if an offline path to the target file server is not found for the data object ID, then execution continues from step 168 to step 169. In this case, the source file is a first instance of a de-duplicated file to be migrated from the source file server to the target file server. In step 169, the data processor migrates the source file from the source file server to the target file server, by using a file copy that copies attributes of the source file and data of the data object of the source file. The compressed data is transferred from the source file server to the target file server if the data object is compressed and the target server supports compression. Execution continues from step 169 to step 170. In step 170, the data processor updates the offline path database by inserting a record of the offline path to the migrated file in the target file server in association with the data object ID of the migrated file data, and then execution returns.

In step 168, if the searching of the offline path data base finds an offline path to the target file server for the data object ID, then execution branches from step 168 to step 171. In step 171, the data processor calls a subroutine for migrating the stub inode of the source file to the target file server by creating a clone inode of the file at the offline path in the target file server and copying the attributes of the source file to the clone inode in the target file server. For example, the data processor in the primary file server sends a remote application interface call to the clone file routine (73 in FIG. 3) in the secondary file server in order to create the clone inode of the file at the offline path in the secondary file server. After step 171, execution returns.

Figure 15:
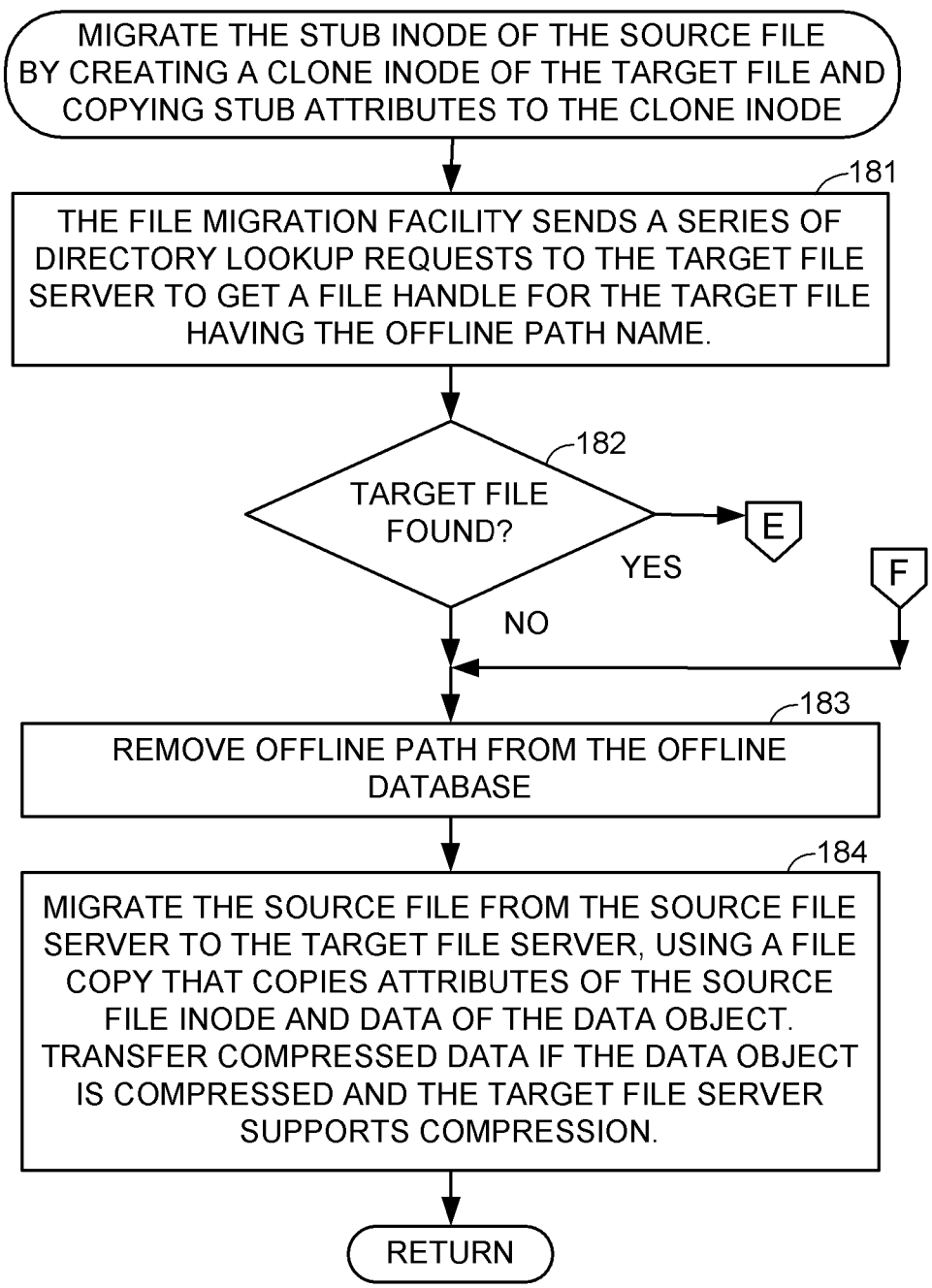
FIGS. 15, 16, and 17 together comprise a flowchart of a subroutine for migrating a stub inode of a source file by cloning an inode of a target file and copying stub attributes to the clone inode.
Figure 16:
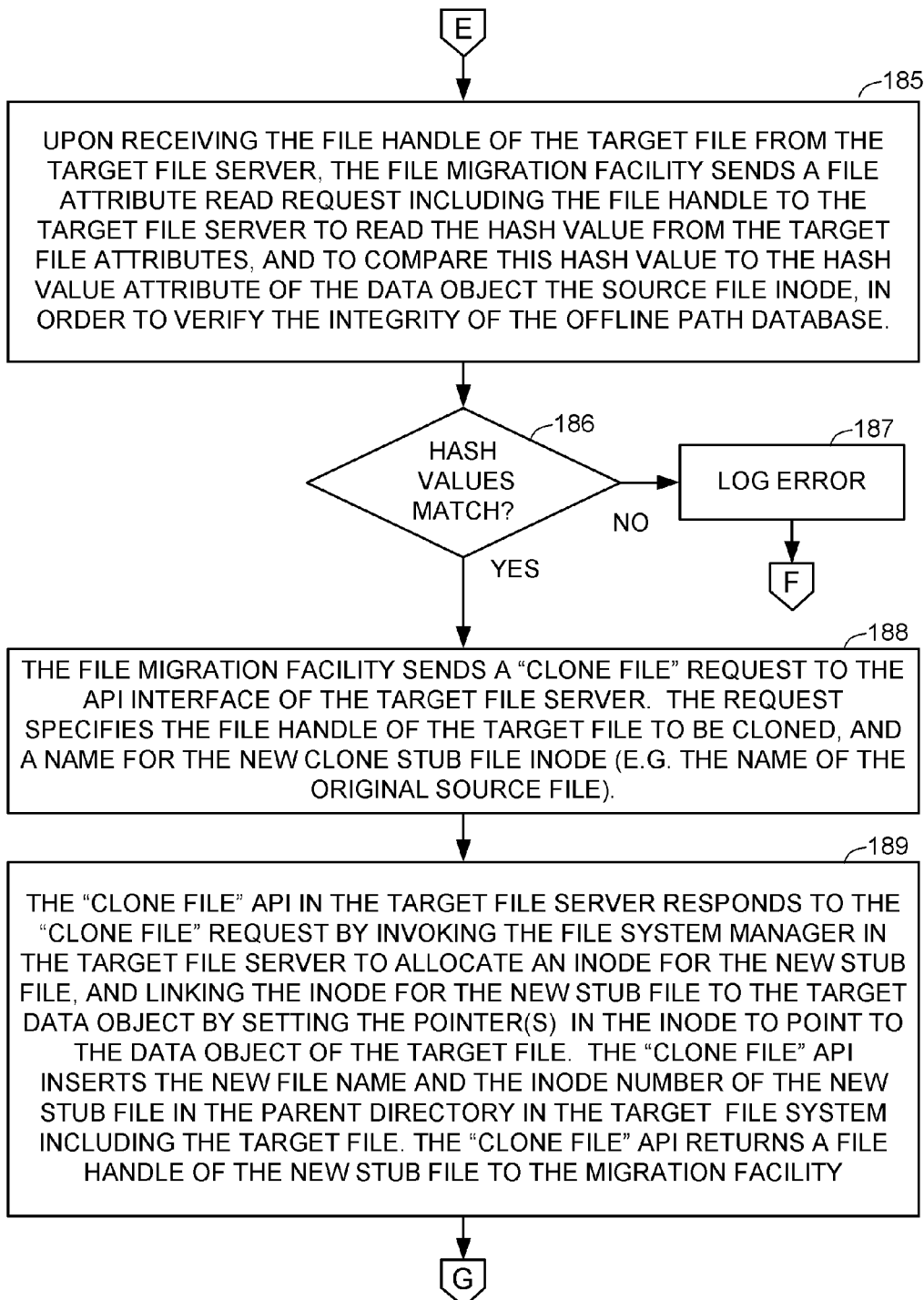
Figure 17:
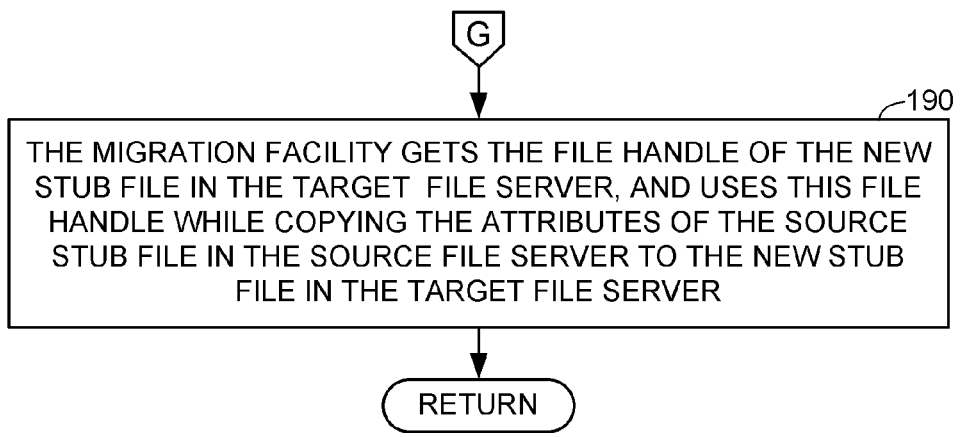

FIGS. 15, 16, and 17 show a flowchart of the subroutine called in step 171 of FIG. 14. In a first step 181 of FIG. 15, the file migration facility sends a series of directory lookup requests to the target file server to get a file handle for the target file having the offline path name from the offline database. In step 182, if the target file is not found in the target file server, then execution continues to step 183. In step 183, the file migration facility removes the offline path from the offline path database. Then, in step 184, the file migration facility migrates the source file from the source file server to the target file server, using a file copy that copies attributes of the source file inode and data of the data object. Compressed data is transferred from the source file server to the target file server if the data object is compressed and the target file server supports compression. After step 184, execution returns.

In step 182, if the target file is found in the target file server, then execution branches to step 185 in FIG. 16. In step 185, upon receiving the file handle of the target file from the target file server, the file migration facility sends a file attribute read request including the file handle to the target file server to read the hash value from the target file attributes, and to compare the hash value to the hash value attribute of the data object of the source file inode, in order to verify the integrity of the offline path database. If the hash values do not match, then execution branches from step 186 to step 187 to log the error in step 187, and to continue from step 187 to step 183 in FIG. 15.

In step 186, if the hash values match, then execution continues from step 186 to step 188. In step 188, the file migration facility sends a "clone file" request to the API interface of the target file server. The request includes the file handle of the target file to be cloned, and a name for the new clone stub file inode (e.g., the name of the original source file). The request may also include, as optional parameters, the inode number of the original source file, and a flag indicating whether or not a clone with a different inode number is acceptable or not. In step 189, the "clone file" API in the target file server responds to the "clone file" request by invoking the file system manager in the target file server to allocate an inode number for the new stub file, and linking the inode for the new stub file to the target data object of the target file. If the API request specifies an inode number, then the file system manager will attempt to allocate this same inode number for the new stub file. If this is possible, then the migration process may preserve the inode number and hence the NFS file handle when migrating the file. The "clone file" API also inserts the new file name and the inode number of the new stub file in the parent directory in the target file system including the target file. The "clone file" API returns a file handle of the new stub file to the migration facility. Execution continues from step 189 to step 190 in FIG. 17.

In step 190 of FIG. 17, the migration facility gets the file handle of the new stub file in the target file server, and uses this file handle while copying the attributes of the source stub file in the source file server to the new stub file in the target file server. As a result, a copy of the attributes of the source file is created in the target file server and associated with the data of the target data object of the target file. After step 190, execution returns.

The operations of steps 189 and 190 could be performed in one step by providing the attributes of the source file as additional parameters of the "clone file" request. In this case, once the specified target file is found, the new stub file is created immediately with all of the specified attributes.

Figure 18:
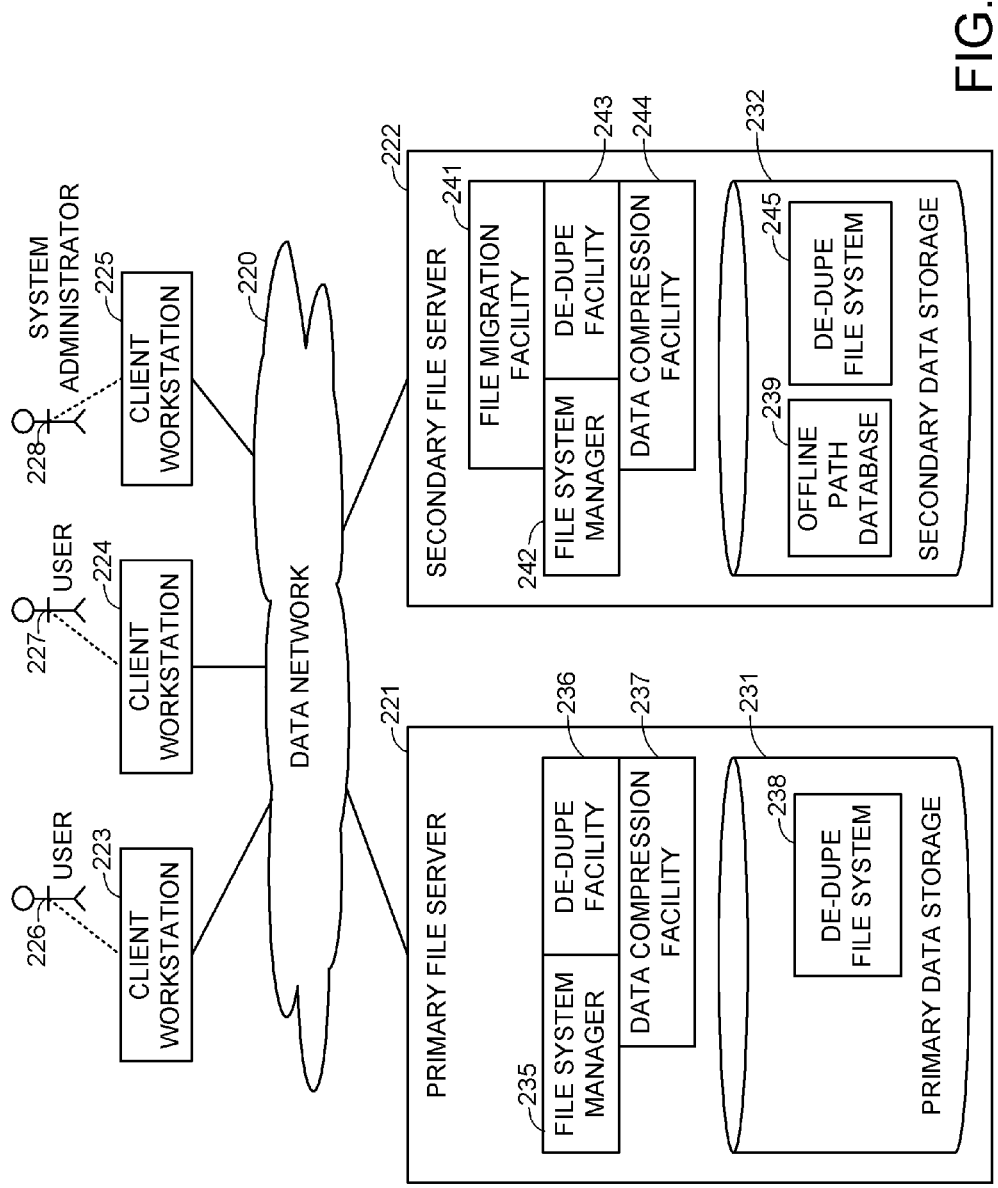
FIG. 18 is block diagram of a data processing system employing migration of replicated files in accordance with the present invention for remote access of read-only files.

FIG. 18 shows a data processing system employing migration of replicated files in accordance with the present invention for remote access of read-only files. In the data processing system of FIG. 18, the file migration facility 241 and the offline path database 239 are located in the secondary file server 222 instead of the primary file server 221, and the backup facility (41 in FIG. 1) and archival storage unit (33 in FIG. 1) are not used in the data processing system of FIG. 18. In the data processing system of FIG. 18, files to be migrated are "pulled" rather than "pushed" from the primary file server 221 to the secondary file server 222.

The data processing system of FIG. 18 includes a data network 220 linking the primary file server 221 to the secondary file server for serving client workstations 223, 224, 225 operated by human users 226, 227, 228. The data network 220, for example, is an Ethernet or Internet Protocol (IP) data network. The user 228 is a system administrator responsible for configuration and maintenance of the data processing system.

The primary file server 221 includes primary data storage 231, and the secondary file server 222 includes secondary data storage 232. The primary data storage 231 and the secondary data storage 232, for example, are solid-state disk drives or rotating magnetic disk drives. The primary data storage 231 stores a de-dupe file system 238, and the secondary data storage 232 stores a de-dupe file system 245. The secondary data storage 232 also stores the offline path database 239. The de-dupe file system 245 is maintained as a remote cache of read-only copies of the files in the de-dupe file system 238 in the primary data storage 231.

The primary file server 221 is programmed with a file system manager 235, a de-dupe facility 236, and a data compression facility 237. The secondary file server 222 is programmed with a file migration facility 241, a file system manager 242, a de-dupe facility 243, and a data compression facility 244. Except for the absence of a file migration facility and an offline path database, the primary file server 221 is constructed as shown and described above with reference to FIG. 2. Except for the presence of the file migration facility 241 and the offline path database 239 and the absence of a backup facility, the secondary file server 222 is construction as shown and described above with reference to FIG. 3.

The offline path database 239 is similar to the offline path database 39 shown in FIG. 6, except the records in the offline path database 239 do not store the target server name in the offline pathname field, because all of the offline paths stored in the offline path database 239 are offline paths to the secondary file server.

The file migration facility 241 of FIG. 18 differs somewhat from the file migration facility 34 of FIG. 1 because the file migration facility 241 uses network file access protocols rather than subroutine or function calls to access source file information, and uses subroutine or function calls rather than file access protocols to access target file information.

Figure 19:
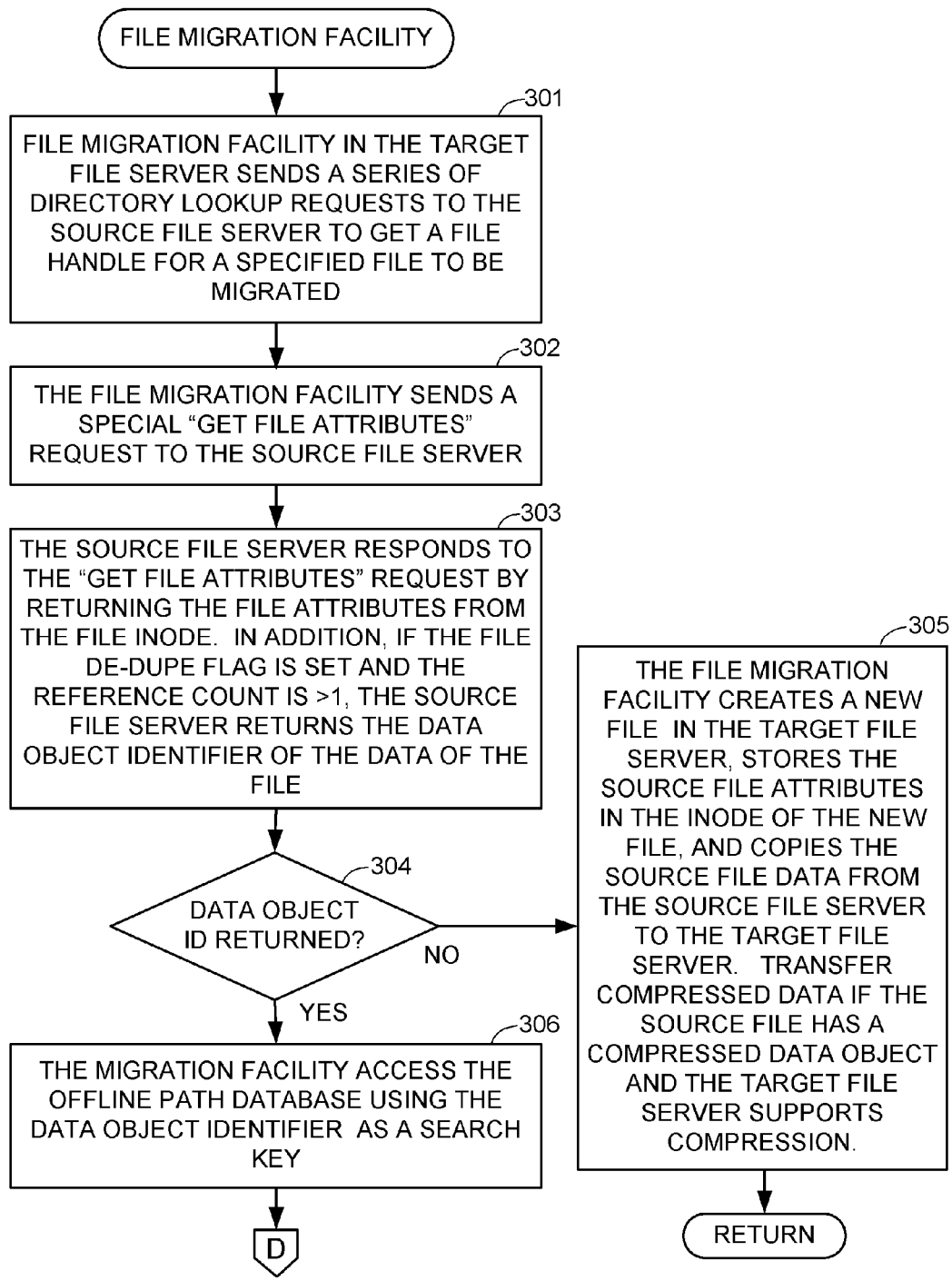
FIG. 19, in combination with FIG. 14, is a flowchart of the migration facility in the data processing system of FIG. 18.

FIG. 19 is a flowchart showing how the file migration facility 241 in FIG. 18 could use a modified file access protocol to speed up migration of replicated files. In a first step 301, the file migration facility in the target file server sends a series of directory lookup requests to the source file server to get a file handle for a specified file to be migrated. In step 302, the file migration facility sends a special "get file attributes" request to the source file server. In step 303, the source file server responds to the "get file attributes" request by returning the file attributes from the file inode. In addition, if the file de-dupe flag is set and the reference count for the file data is greater than one, then the source file server returns the data object identifier of the data of the file. In step 304, if the file migration facility finds that a data object identifier was not returned with the source file attributes, then execution branches to step 305. In step 305, the file migration facility creates a new file in the target file server, stores the source file attributes in the inode of the new file, and copies the source file data from the source file server to the target file server. Compressed data is transferred from the source file server to the target file server if the source file has a compressed data object and the target file server supports compression. After the source file has been copied in step 305, execution returns.

In step 304, if the file migration facility finds that the source file server has returned a data object identifier with the file attributes, then execution continues from step 304 to step 306. In step 306, the file migration facility accesses the offline path database using the data object identifier as a search key. Execution continues form step 306 to step 168 of FIG. 14, to continue the migration as described above with reference to FIG. 14.

Although the invention has been described above with respect to one embodiment in which the migration facility and the offline database are located in a primary or source file server and another embodiment in which the migration facility and the offline path database are located in a secondary or target file server, it should be apparent that the migration facility and the offline path database could be located in other places in the data processing network of FIG. 1, such as in the client workstation 25 of the system administrator, or in a namespace server separate from the primary file server 21 and separate from the secondary file server 22.

It should also be apparent that the decision of when a record of a migrated file should be stored in or removed from the offline path database, and when the offline path database should be searched for a prior instance of a file being migrated, could take into consideration additional information regarding the migrated file and the configuration and state of the data network, such as the size of the file, the distance between the source file server and the target file server and congestion of the data network, and the number of records presently stored in the offline path database. In general, the decision of when a record of a migrated file should be stored in or removed from the offline path database, and when the offline path database should be searched for a prior instance of a file being migrated, is a governed by a balance of the relative cost of maintaining and searching the offline path database versus the relative savings in data processing capability and network bandwidth due to the elimination of the transmission of duplicate file data between the file servers and de-duplication of the duplicate file data at the target file server. Thus, factors promoting a decision that a record of a migrated file should be kept in the offline path database and the offline path database should be searched for a prior instance of a file being migrated include, in addition to a reference count greater than one, a relatively large file size, a relatively large distance between the source and target file server, a relatively high degree of data network congestion, and a relatively small number of records presently in the offline path database.

In view of the above, migration of replicated files in a data network is made more efficient in both time and network bandwidth by recognizing when the target file server already contains the data of a replicated file in order to eliminate needless transfer of duplicate file data. This can be done in a way that is compatible with conventional file access protocols, file system management, and file de-duplication. For example, needless migration of duplicate file data is avoided by recording in a database a record of migration of a first instance of a replicated file from a source file server to a target file server. When migrating a subsequent instance of a replicated file to the target file server, the database is searched for a record of replication of a first instance of the replicated file to the target file server. If such a record is found, the subsequent instance is replicated by sending from the source file server to the target file server attributes of the subsequent instance of the replicated file and an identification of the previously migrated data of the replicated file without re-transmission of the previously migrated data of the replicated file.

What is claimed is:

1. A computer-implemented method of at least one data processor executing a file migration program in memory in response to a request for migration of a specified file from a source file server to a target file server in a data network, said method comprising the steps of:
   (a) searching storage in the data network for a record indicating that the target file server contains a replica of the specified file, the replica of the specified file having data of the specified file, and the replica of the specified file having attributes different from attributes of the specified file; and
   (b) in response to finding a record indicating that the target file server contains a replica of the specified file, creating a copy of the specified file in the target file server by copying the attributes but not the data of the specified file from the source file server to the target file server and associating the copied attributes of the specified file in the target file server with the data of the replica of the specified file in the target file server.

2. The computer-implemented method as claimed in claim 1, wherein the method further includes storing the record indicating that the target file server contains a replica of the specified file when the execution of the file migration program determines that a first instance of a replicated file is being migrated to the target file server.

3. The computer-implemented method as claimed in claim 1, wherein the record indicating that the target file server contains a replica of the specified file includes a file identifier of the replica and an identifier of the data of the replica, and wherein the step (a) of searching storage includes searching the storage for a record containing a specified identifier of data in the specified file and finding the file identifier of the replica associated with the specified identifier of the data of the replica.

4. The computer-implemented method as claimed in claim 3, wherein the method further includes searching storage of the source file server to find the specified identifier of the data in the specified file.

5. The computer-implemented method as claimed in claim 3, wherein the method further includes searching the storage of the source file server to determine whether storage of the source file server contains more than one replica of the specified file, and in response to determining that the storage of the source file server contains more than one replica of the specified file, obtaining the specified identifier of the data in the specified file from the storage of the source file server in order to perform the copying of the attributes but not the data of the specified file from the source file server to the target file server and the associating of the copied attributes of the specified file in the target file server with the data of the replica of the specified file in the target file server, and otherwise copying the attributes and the data of the specified file to the target file server when the storage of the source file server does not contain more than one replica of the specified file.

6. A computer-implemented method of at least one data processor executing a file migration program in memory to migrate instances of a replicated file from a source file server to a target file server, each of the instances of the replicated file having the same file data but having different file attributes, said method comprising:
   upon migration of attributes and data of a first instance of the replicated file from the source file server to the target file server, recording in a database a record of migration of the first instance of the replicated file from the source file server to the target file server; and
   upon migration of a second instance of the replicated file, searching the database for a record of a prior migration of an instance of the replicated file, and in response to finding the record of the migration of the first instance of the replicated file in the database, migrating the second instance of the replicated file from the source file server to the target file server by sending from the source file server to the target file server attributes of the second instance of the replicated file and an identification of the previously migrated data of the replicated file so that the second instance of the replicated file is migrated from the source file server to the target file server without re-transmission of the previously migrated data of the replicated file;
   which further includes said at least one data processor executing a file de-duplication program in memory in order to de-duplicate instances of the replicated file to produce file inodes sharing data of the replicated file in storage of the source file server, the execution of the file de-duplication program producing a reference count of the file inodes sharing the data of the replicated file in the storage of the source file server, and the recording in the database of the migration of the first instance of the replicated file from the source file server to the target file server being performed in response to execution of the migration program finding that the reference count is greater than one upon migrating the first instance of the replicated file.

7. A computer-implemented method of at least one data processor executing a file migration program in memory to migrate instances of a replicated file from a source file server to a target file server, each of the instances of the replicated file having the same file data but having different file attributes, said method comprising:

upon migration of attributes and data of a first instance of the replicated file from the source file server to the target file server, recording in a database a record of migration of the first instance of the replicated file from the source file server to the target file server; and upon migration of a second instance of the replicated file, searching the database for a record of a prior migration of an instance of the replicated file, and in response to finding the record of the migration of the first instance of the replicated file in the database, migrating the second instance of the replicated file from the source file server to the target file server by sending from the source file server to the target file server attributes of the second instance of the replicated file and an identification of the previously migrated data of the replicated file so that the second instance of the replicated file is migrated from the source file server to the target file server without re-transmission of the previously migrated data of the replicated file;

which further includes said at least one data processor executing a file de-duplication program in memory in order to de-duplicate instances of the replicated file to produce file inodes sharing data of the replicated file in storage of the source file server, the execution of the file de-duplication program producing a reference count of the file inodes sharing the data of the replicated file in the storage of the source file server, and the searching of the database for a record of a prior migration of an instance of the replicated file being performed in response to execution of the migration program finding that the reference count is greater than one upon migrating the second instance of the replicated file.

8. A data processing system comprising:

a source file server and a target file server in a data network; and memory containing a file migration program, the file migration program being executed by at least one data processor in the data processing system to migrate instances of a replicated file from the source file server to the target file server, each of the instances of the replicated file having the same file data but different file attributes; wherein upon migration of attributes and data of a first instance of the replicated file from the source file server to the target file server, execution of the file migration program includes recording in a database a record of migration of the first instance of the replicated file from the source file server to the target file server; and upon migration of a second instance of the replicated file, execution of the migration program includes searching the database for a record of a prior migration of an instance of the replicated file, and in response to finding the record of migration of the first instance of the replicated file in the database, migrating the second instance of the replicated file from the source file server to the target file server by sending from the source file server to the target file server attributes of the second instance of the replicated file and an identification of the previously migrated data of the replicated file so that the second instance of the replicated file is migrated from the source file server to the target file server without re-transmission of the previously migrated data of the replicated file;

which further includes a file de-duplication program in memory and executed by said at least one data processor in order to de-duplicate instances of the replicated file to produce file inodes sharing data of the replicated file in storage of the source file server, execution of the file de-duplication program producing a reference count of the file inodes sharing the data of the replicated file in the storage of the source file server, and the recording in the database of the migration of the first instance of the replicated file from the source file server to the target file server is performed in response to execution of the migration program finding that the reference count is greater than one upon migrating the first instance of the replicated file.

9. A data processing system comprising:

a source file server and a target file server in a data network; and memory containing a file migration program, the file migration program being executed by at least one data processor in the data processing system to migrate instances of a replicated file from the source file server to the target file server, each of the instances of the replicated file having the same file data but different file attributes; wherein upon migration of attributes and data of a first instance of the replicated file from the source file server to the target file server, execution of the file migration program includes recording in a database a record of migration of the first instance of the replicated file from the source file server to the target file server; and upon migration of a second instance of the replicated file, execution of the migration program includes searching the database for a record of a prior migration of an instance of the replicated file, and in response to finding the record of migration of the first instance of the replicated file in the database, migrating the second instance of the replicated file from the source file server to the target file server by sending from the source file server to the target file server attributes of the second instance of the replicated file and an identification of the previously migrated data of the replicated file so that the second instance of the replicated file is migrated from the source file server to the target file server without re-transmission of the previously migrated data of the replicated file;

which further includes a file de-duplication program in memory and executed by said at least one data processor in order to de-duplicate instances of the replicated file to produce file inodes sharing data of the replicated file in storage of the source file server, execution of the file de-duplication program producing a reference count of the file inodes sharing the data of the replicated file in the storage of the source file server, and the searching of the database for a record of a prior migration of an instance of the replicated file being performed in response to execution of the migration program finding that the reference count is greater than one upon migrating the second instance of the replicated file.

* * * * *